United States Patent
Bertollini et al.

(10) Patent No.: US 10,427,602 B1
(45) Date of Patent: Oct. 1, 2019

(54) OPTICAL SYSTEM FOR ENHANCING DISPLAY VIEWING COMFORT

(71) Applicant: GM Global Technology Operations LLC, Detroit, MI (US)

(72) Inventors: Gary P. Bertollini, Lake Orion, MI (US); Kai-Han Chang, Sterling Heights, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 0 days.

(21) Appl. No.: 16/014,616

(22) Filed: Jun. 21, 2018

(51) Int. Cl.
| | |
|---|---|
| H04N 7/00 | (2011.01) |
| H04N 13/00 | (2018.01) |
| B60R 1/00 | (2006.01) |
| G02B 3/08 | (2006.01) |
| G02B 5/32 | (2006.01) |
| G02B 3/00 | (2006.01) |
| H04N 5/225 | (2006.01) |
| G02B 27/01 | (2006.01) |
| G02B 27/00 | (2006.01) |
| H04N 5/89 | (2006.01) |
| H04N 7/18 | (2006.01) |
| A61B 1/04 | (2006.01) |

(52) U.S. Cl.
CPC ............ *B60R 1/00* (2013.01); *G02B 3/0056* (2013.01); *G02B 3/08* (2013.01); *G02B 5/32* (2013.01); *G02B 27/0068* (2013.01); *G02B 27/0101* (2013.01); *H04N 5/2257* (2013.01); *B60R 2300/8046* (2013.01); *G02B 2027/0138* (2013.01)

(58) Field of Classification Search
USPC .......................... 348/118, 120, 40, 61, 64, 73
See application file for complete search history.

(56) References Cited

U.S. PATENT DOCUMENTS

| | | | |
|---|---|---|---|
| 2008/0018986 A1* | 1/2008 | Maram | G02B 26/0808 359/298 |
| 2016/0299342 A1* | 10/2016 | Asai | B60K 35/00 |
| 2018/0004473 A1* | 1/2018 | Amaru | B60K 37/00 |
| 2018/0172993 A1* | 6/2018 | Nill | G02B 27/0101 |
| 2018/0297522 A1* | 10/2018 | Omanovic | B60R 1/00 |
| 2019/0011556 A1* | 1/2019 | Pacala | H01L 25/167 |

* cited by examiner

*Primary Examiner* — Daquan Zhao
(74) *Attorney, Agent, or Firm* — Quinn IP Law

(57) ABSTRACT

An optical system for a vehicle includes a rearview display configured to display an image of an area behind the vehicle and a positive optical device in optical communication with the rearview display. As such, the image displayed by the rearview display is projected to a virtual image plane that is spaced apart from the positive optical device by a predetermined virtual image distance in order to minimize an accommodation and a convergence of the vehicle operator's eyes when the vehicle operator's eyes switch focus between the rearview display and an object located outside and in front of the vehicle.

6 Claims, 3 Drawing Sheets

OPTICAL SYSTEM FOR ENHANCING DISPLAY VIEWING COMFORT

INTRODUCTION

The present disclosure relates to optical systems for enhancing display viewing comfort.

Vehicles sometimes include a camera that captures images rearward of the vehicle. These cameras facilitate viewing areas rearward of the vehicle without using a mirror. Specifically, vehicle operators are able to view the images captured by these cameras through a display. It is therefore desirable to enhance the vehicle operator's viewing comfort when the vehicle operators look at these displays.

SUMMARY

The present disclosure describes a vehicle including an optical system for enhancing display viewing comfort when the vehicle operator's eyes switch focus between a rearview display and an object (e.g., another vehicle) located outside and in front of the vehicle. Vehicle operators may experience discomfort when viewing a video image located at the traditional rearview mirror location. This issue is caused by the vehicle operator's eyes rapidly switching accommodation and convergence from a virtual image plane (i.e., forward view out of the windshield) to a closer image plane (at the rearview mirror location—where the rearview display is located). This issue may cause vehicle operators to turn off the rearview camera system feature, opting to use the traditional reflection mirror and negating the benefits of the rearview display. The optical system facilitates the accommodation and convergence transition of the vehicle operator's eyes between a front image plane and a rear image plane by presenting the vehicle operator with a rearward virtual image that is formed at a distance farther than the display plane location, thereby eliminating the discomfort associated with using the rearview display.

In some embodiments, an optical system for a vehicle includes a rearview display configured to display an image rearward of the vehicle and a positive optical device in optical communication with the rearview display such that the image displayed by the rearview display is projected to a virtual image plane that is spaced apart from the positive optical device by a predetermined virtual image distance sufficient to minimize an accommodation and a convergence of the vehicle operator's eyes when the vehicle operator's eyes switch focus between the rearview display and an object located outside and in front of the vehicle.

The positive optical device may be a Fresnel lens. The distance from the Fresnel lens to the rearview display is less than a focal length of the Fresnel lens in order to minimize the accommodation and convergence of vehicle operator's eyes when the vehicle operator's eyes switch focus between the rearview display and the object located outside and in front of the vehicle.

The relative location of the virtual image and rearview display introduced by the Fresnel lens that minimizes the accommodation and convergence is expressed as follows:

$$L - d_o + |d_i| > L$$

where:

L is a distance from the vehicle operator's eyes to the rearview display;

$d_o$ is a distance from the Fresnel lens to the rearview display;

$d_i$ is a distance from the Fresnel lens to a virtual image generated by the Fresnel lens, and the distance from the Fresnel lens to a virtual image generated by the Fresnel lens is the same as the predetermined virtual image distance.

The distance from the Fresnel lens to the rearview display is less than the focal length of the Fresnel lens. The absolute value of the distance from the Fresnel lens to the virtual image generated by the Fresnel lens is greater than the distance from the Fresnel lens to the rearview display.

The focal length of the Fresnel lens is greater than zero and its relation with $d_i$ and $d_o$ may be expressed as follows:

$$\frac{1}{d_0} + \frac{1}{d_i} = \frac{1}{f}$$

where:

$d_o$ is the distance from the Fresnel lens to the rearview display (i.e., the predetermined spacing distance $d_o$);

$d_i$ is the distance from the positive optical device (e.g., Fresnel lens) to the virtual image generated by the Fresnel lens; and f is the focal length of the Fresnel lens.

The positive optical device may be a microlens array. Each pixel of the rearview display is aligned with each microlens of the microlens array in order to minimize the accommodation and convergence of the vehicle operator's eyes when the vehicle operator's eyes switch focus between the rearview display and the object located outside and in front of the vehicle.

The positive optical device may be a transmissive spatial light modulator. A controller is in electronic communication with the transmissive spatial light modulator in order to tune a local refractive index of the transmissive spatial light modulator. The positive optical device may alternatively be a holographic waveguide integrated with a windshield of the vehicle.

The present disclosure also describes a vehicle including, a vehicle body, a windshield coupled to the vehicle body, a rearview camera coupled to the vehicle body such that the rearview camera is positioned to capture images rearward of the vehicle, and a rearview display coupled to the windshield. The rearview display is configured to display an image captured by the rearview camera. The vehicle further includes a positive optical device in optical communication with the rearview display as described above.

The above features and advantages and other features and advantages of the present disclosure are readily apparent from the following detailed description of the best modes for carrying out the disclosure when taken in connection with the accompanying drawings.

DETAILED DESCRIPTION

Figure 1:
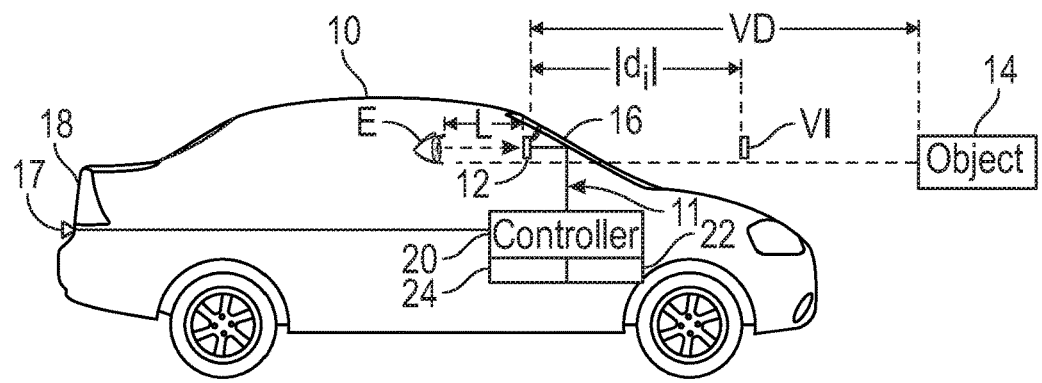
FIG. 1 is a schematic side view of a vehicle including an optical system for enhancing display viewing comfort.

With reference to FIG. 1, a vehicle 10 includes an optical system 11 for enhancing display viewing comfort when the vehicle operator's eyes E switch focus between a rearview display 12 and an object 14 (e.g., a car) located outside and in front of the vehicle 10. Vehicle operators may experience discomfort when viewing a video image located at the traditional rearview mirror location. This issue is caused by the vehicle operator's eyes rapidly switching accommodation and convergence from a virtual image plane (i.e., forward view out of the windshield 16) to a closer image plane (at the rearview mirror location—where the rearview display 12 is located). This issue can cause vehicle operators to turn off the rearview camera system feature, opting to use the traditional reflection mirror and negating the benefits of the rearview display 12. As discussed in detail below, the optical system 11 facilitates the accommodation and convergence transition of the vehicle operator's eyes E between a front image plane and a rear image plane by presenting the vehicle operator with a rearward virtual image VI that is formed at a distance farther than the display plane location, thereby eliminating the discomfort associated with using the rearview display 12.

The rearview display 12 may be in electronic communication with a rearview camera 17. The rearview camera 17 points to rearward of the vehicle in order to capture images behind the vehicle 10 and may be directly coupled to a vehicle body 18 of the vehicle 10. The vehicle 10 may be, for example, a truck, a car, or agricultural equipment and further includes a controller 20 in electronic communication with the rearview display 12 and the rearview camera 17. The terms "control module," "module," "control," "controller," "control unit," "processor" and similar terms mean one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean a controller executable instruction set. In the depicted embodiment, the controller 20 includes a processor 22 and a non-transitory memory 24 in electronic communication with the processor 22. The controller 20 may be configured to process the images captured by the rearview camera 17 and control the operation of the rearview camera 17 and the rearview display 12. The rearview display 12 shows video from the rearview camera 17.

The windshield 16 of the vehicle 10 may be directly coupled to the vehicle body 18. The rearview camera 17 may be directly coupled to the vehicle body 18. As such, the rearview camera 17 is positioned to capture images rearward of the vehicle 10. The rearview display 12 may be directly coupled to the windshield 16. The rearview camera 17 is in electronic communication with the rearview display 12. As such, the rearview display 12 is configured to display an image of an area behind the vehicle 10. In the depicted embodiment, the rearview display 12 is positioned at the traditional rearview mirror location. However, it is contemplated that the rearview display 12 may also be a side view display or other vehicle display located close to the vehicle operator's eyes E and/or displays representing objects at greater distances from the vehicle operator.

Figure 2:
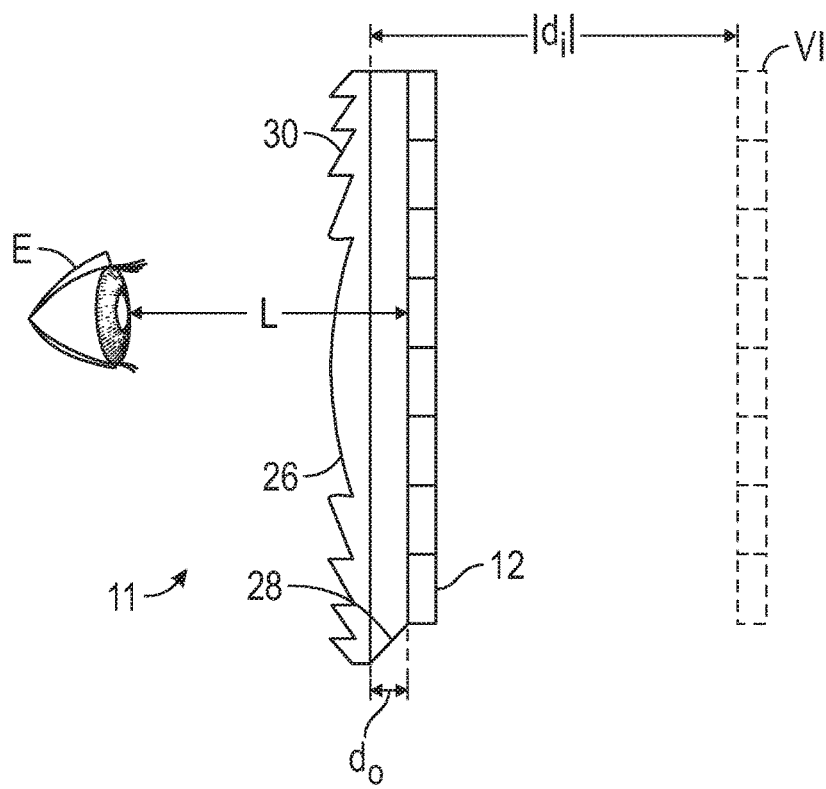
FIG. 2 is a schematic side view of the optical system of FIG. 1, including a Fresnel lens.

With reference to FIG. 2, the optical system 11 of the vehicle 10 also includes a positive optical device 26 in optical communication with the rearview display 12. As such, the image displayed by the rearview display 12 is projected to a virtual image plane VI that is spaced apart from the positive optical device 26 by a predetermined virtual image distance in order to minimize an accommodation and a convergence of the vehicle operator's eyes E when the vehicle operator's eyes E switch focus between the rearview display 12 and the object 14 located outside and in front of the vehicle 10. In the present disclosure, the term "positive optical device" means one or more lenses that are configured to converge a collimated beam of light to a spot (i.e., a focus) across the positive optical device 26. The rearview display 12 and the object 14 located outside of the vehicle 10 are spaced apart from each other by a viewing distance VD. The viewing distance VD is greater than the predetermined virtual image distance $d_i$. A housing 28 physically couples the positive optical device 26 to the rearview display 12. For example, the housing 28 may directly couple the positive optical device 26 to the rearview display 12 to enhance its structural integrity. However, the positive optical device 26 is spaced apart from the rearview display 12 by a predetermined spacing distance $d_o$.

With continuing reference to FIG. 2, in the depicted embodiment, the positive optical device 26 is a Fresnel lens 30. The term "Fresnel lens" means a lens that has a surface consisting of a concentric series of simple lens sections so that a thin lens with a short focal length and large diameter is possible and that is used especially for spotlights. In the depicted embodiment, the distance from the Fresnel lens to the rearview display (i.e., the predetermined spacing distance $d_o$) is less than a focal length f of the Fresnel lens 30 in order to minimize the accommodation and convergence of the vehicle operator's eyes E when the vehicle operator's eyes E switch focus between the rearview display 12 and the object 14 located outside and in front of the vehicle 10. To minimize the accommodation and convergence of the vehicle operator's eyes E when the vehicle operator's eyes E switch focus between the rearview display 12 and the object 14 located outside and in front of the vehicle 10, the relative location of the virtual image VI and the rearview display 12 introduced by the Fresnel lens 30 is expressed by the following equation:

$$L - d_o + |d_i| > L$$

where:

L is the distance from the vehicle operator's eyes E to the rearview display 12;

$d_o$ is the distance from the Fresnel lens 30 to the rearview display 12 (i.e., the predetermined spacing distance $d_o$);

$d_i$ is the distance from the Fresnel lens 30 to the virtual image VI generated by the Fresnel lens 30 (i.e., the predetermined virtual image distance $d_i$).

It is understood that the distance L from the from the vehicle operator's eyes E to the rearview display 12 may vary based on multiple variables. However, it in this context, the distance L from the from the vehicle operator's eyes E to the rearview display 12 is a predetermined value based on vehicle dimensions and vehicle testing. To minimize eye fatigue, the focal length f of the Fresnel lens 30 is greater than zero, and may be expressed with the following equation:

$$\frac{1}{d_0} + \frac{1}{d_i} = \frac{1}{f}$$

where:

$d_o$ is the distance from the Fresnel lens 30 to the rearview display 12 (i.e., the predetermined spacing distance $d_o$);

$d_i$ is the distance from the positive optical device 26 (e.g., Fresnel lens 30) to the virtual image VI generated by the Fresnel lens 30 (i.e., the predetermined virtual image distance $d_i$); and f is the focal length of the Fresnel lens 30.

When the distance from the Fresnel lens 30 to the rearview display 12 is less than the focal length f of the Fresnel lens 30 (i.e., predetermined spacing distance $d_o$), the virtual image VI of the rearview display 12 forms on the same side as the rearview display 12 with the absolute value of the distance from the Fresnel lens 30 to the virtual image VI generated by the Fresnel lens 30 (i.e., the absolute value of the predetermined virtual image distance |$d_i$|) being greater than the distance from the Fresnel lens to the rearview display. The optical characteristic of the optical system 11 as described above minimize eye fatigue by minimizing the accommodation and convergence of the vehicle operator's eyes E when the vehicle operator's eyes E switch focus between the rearview display 12 and the object 14 located outside and in front of the vehicle 10.

Figure 3:
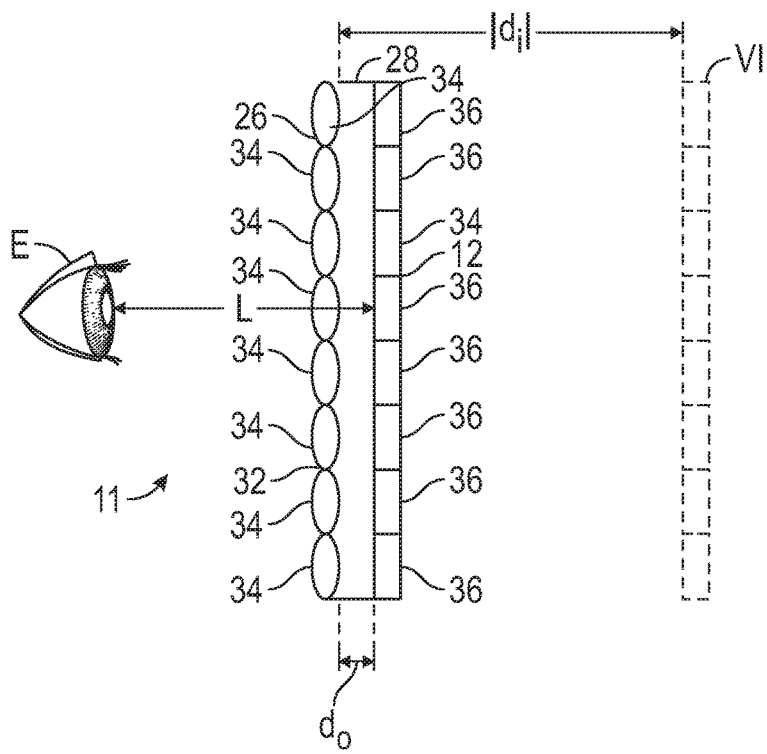
FIG. 3 is a schematic side view of the optical system of FIG. 1, including a microlens array.

With reference to FIG. 3, in this embodiment, the positive optical device 26 is a microlens array (MLA) 32. In the interest of brevity, solely the differences between the embodiment described above with respect to FIG. 2 and this embodiment are discussed below. The equations and distance relationships described above with respect to FIG. 2 also apply to the MLA 32. The MLA 32 includes a plurality of microlenses 34 directly connected to each other. Each pixel 36 of the rearview display 12 is aligned with each microlens 34 of the microlens array 32 in order to minimize the accommodation and convergence of the vehicle operator's eyes E when the vehicle operator's eyes switch focus between the rearview display 12 and an object 14 located outside and in front of the vehicle 10. As a consequence, the pixelating imaging is equal or greater than the reduced distortion. In the present disclosure, the term "microlens" means a lens with a diameter that is less one millimeter.

Figure 4:
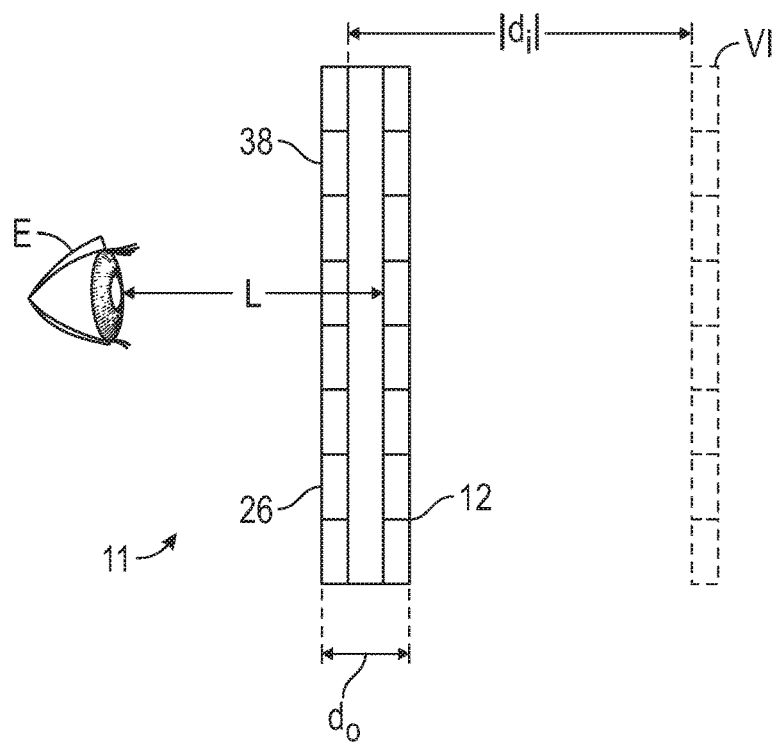
FIG. 4 is a schematic side view of the optical system of FIG. 1, including a transmissive spatial light modulator.
Figure 5:
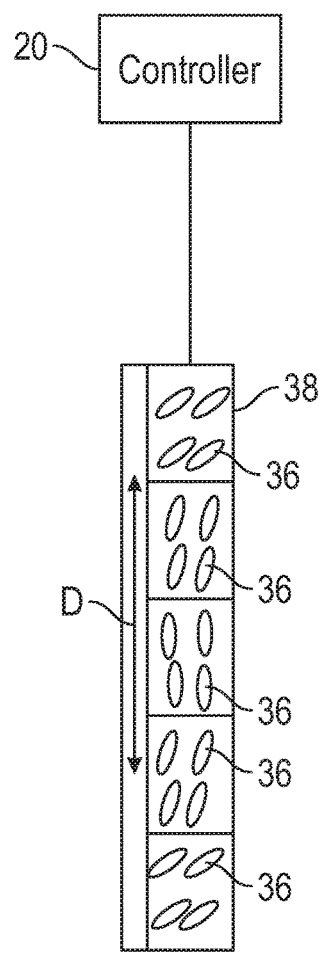
FIG. 5 is a schematic side view of the transmissive spatial light modulator of FIG. 4.

With reference to FIGS. 4 and 5, the positive optical device 26 may be formed by a transmissive spatial light modulator (SLM) 38 that is a transmissive device that spatially modulate the amplitude and/or phase of an optical wavefront in at least two dimensions. For example, the transmissive SLM 38 may be a liquid crystal on silicon (LCOS) panel that modulates incident light in a spatial pattern corresponding to an electrical and/or optical input. For instance, the controller 20 is in electronic communication with the transmissive SLM 38 and may therefore electrically modulate each pixel in the transmissive SLM 38. The controller 20 may modulate, via the SLM 38, the phase and/or intensity of the incident light with polarization D to form a positive optical device that has a similar effect as a Fresnel Lens or an MLA. For instance, the transmissive SLM 38 may modulate the spatial pattern of each pixel 36 in order to tune the refractive indices locally on the SLM 38 per pixel 36 and form a positive optical device. To minimize eye fatigue, the transmissive SLM 38 modulates each pixel 36 such that each lens has a focal length that is greater than zero. In this embodiment, the absolute value of the distance $d_o$ from the positive optical device 26 to the virtual image generated by the positive optical device 26 is greater than the distance from the positive optical device 26 to the rearview display 12 (i.e., the predetermined spacing distance $d_o$).

Figure 6:
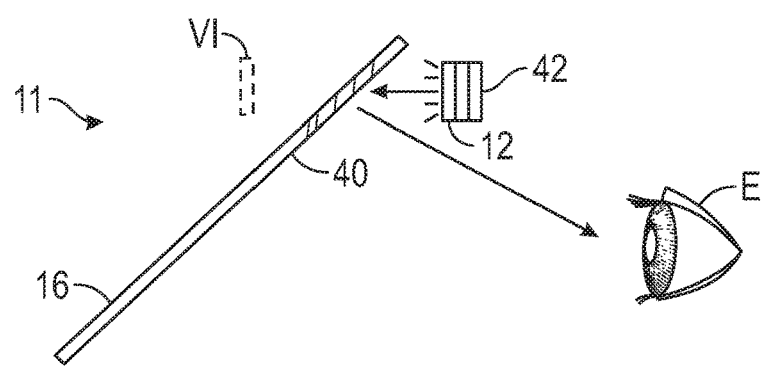
FIG. 6 is a schematic side view of the optical system of FIG. 1, including a holographic waveguide integrated with a windshield.

With reference to FIG. 6, the positive optical device 26 is a holographic waveguide 40 integrated with the windshield 16 of the vehicle 10. In other words, the holographic waveguide 40 is directly coupled and disposed entirely within the windshield 16. The rearview display 12 shows video from the rearview camera 17 and has a wider view than a traditional rearview mirror 42 that is attached to the rearview display 12. Due to the holographic waveguide 40, the virtual image VI is projected farther than other displays.

While the best modes for carrying out the disclosure have been described in detail, those familiar with the art to which this disclosure relates will recognize various alternative designs and embodiments for practicing the disclosure within the scope of the appended claims.

What is claimed is:

1. An optical system for a vehicle, comprising:
   a rearview display configured to display an image of an area behind the vehicle; and
   a positive optical device in optical communication with the rearview display such that the image displayed by the rearview display is projected to a virtual image plane that is spaced apart from the positive optical device by a predetermined virtual image distance in order to minimize an accommodation and a convergence of vehicle operator's eyes when the vehicle operator's eyes switch focus between the rearview display and an object located outside and in front of the vehicle;
   wherein the positive optical device is a Fresnel lens;
   wherein a distance from the Fresnel lens to the rearview display is less than a focal length of the Fresnel lens in order to minimize the accommodation and the convergence of the vehicle operator's eyes when the vehicle operator's eyes switch focus between the rearview display and the object located outside and in front of the vehicle;
   wherein a relative location of a virtual image generated by the Fresnel lens and the rearview display introduced by the Fresnel lens is expressed as follows:

$L - d_o + |d_i| > L$ where:
   L is a distance from the vehicle operator's eyes to the rearview display;
   $d_o$ is a distance from the Fresnel lens to the rearview display; and
   $d_i$ is a distance from the Fresnel lens to a virtual image generated by the Fresnel lens, and the distance from the Fresnel lens to a virtual image generated by the Fresnel lens is equal to the predetermined virtual image distance.

2. The optical system of claim 1, wherein the distance from the Fresnel lens to the rearview display is less than the focal length of the Fresnel lens.

3. The optical system of claim 2, wherein an absolute value of the distance from the Fresnel lens to the virtual image generated by the Fresnel lens is greater than the distance from the Fresnel lens to the rearview display.

4. The optical system of claim 3, wherein the focal length of the Fresnel lens is greater than zero, and a relation of the focal length of the Fresnel lens with the distance from the Fresnel lens to the rearview display and the distance from the Fresnel lens to the virtual image is expressed as follows:

$$\frac{1}{d_0} + \frac{1}{d_i} = \frac{1}{f}$$

where:
$d_o$ is the distance from the Fresnel lens to the rearview display;
$d_i$ is the distance from the Fresnel lens to the virtual image generated by the Fresnel lens; and
f is the focal length of the Fresnel lens.

5. A vehicle, comprising:
a vehicle body;
a windshield coupled to the vehicle body;
a rearview camera coupled to the vehicle body such that the rearview camera is positioned to capture images of an area behind the vehicle;
a rearview display coupled to the windshield, wherein the rearview display is configured to display an image captured by the rearview camera; and
a positive optical device in optical communication with the rearview display such that the image displayed by the rearview display is projected to a virtual image plane that is spaced apart from the positive optical device by a predetermined virtual image distance in order to minimize an accommodation and a convergence of vehicle operator's eyes when the vehicle operator's eyes switch focus between the rearview display and an object located outside and in front of the vehicle;
wherein the rearview display is directly coupled to the windshield of the vehicle;
wherein the positive optical device is a Fresnel lens, and a distance from the Fresnel lens to the rearview display is less than a focal length of the Fresnel lens to minimize an accommodation and a convergence of the vehicle operator's eyes when the vehicle operator's eyes switch focus between the rearview display and an object located outside and in front of the vehicle;
wherein a relative location of a virtual image generated by the Fresnel lens and the rearview display is expressed by a following equation:

$$L - d_o + |d_i| > L$$

where:
L is a distance from the vehicle operator's eyes to the rearview display;
$d_o$ is a distance from the Fresnel lens to the rearview display; and
$d_i$ is a distance from the Fresnel lens to a virtual image generated by the Fresnel lens, and the distance from the Fresnel lens to a virtual image generated by the Fresnel lens is equal to the predetermined virtual image distance.

6. The vehicle of claim 5, wherein the focal length of the Fresnel lens is greater than the distance from the Fresnel lens to the rearview display, and an absolute value of the distance from the Fresnel lens to the virtual image generated by the Fresnel lens is greater than the distance from the Fresnel lens to the rearview display.

* * * * *